United States Patent
Sautter et al.

(12)

(10) Patent No.: US 6,211,930 B1
(45) Date of Patent: Apr. 3, 2001

(54) VISUAL DISPLAYS

(75) Inventors: Wolfgang Sautter, Reutlingen; Traugott Kallfass, Grossbottwar; Gerhard Bader, Munich; Ernst Lueder, Stuttgart, all of (DE); Kenneth R. Knight, Perthshire (GB); Walter Koenig, Neusaess (DE)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/193,953

(22) Filed: Nov. 18, 1998

(30) Foreign Application Priority Data

Nov. 24, 1997 (GB) .................................. 9724781

(51) Int. Cl.$^7$ ................................ G02F 1/1335
(52) U.S. Cl. ................................ 349/66; 349/64
(58) Field of Search ................................ 349/64, 66, 61, 349/62

(56) References Cited

U.S. PATENT DOCUMENTS

| 3,811,751 | 5/1974 | Myer . | |
|---|---|---|---|
| 5,537,233 | 7/1996 | Miura et al. . | |
| 5,570,210 | 10/1996 | Yoshida et al. . | |
| 5,600,456 | * | 2/1997 | Maruyama et al. .................. 349/66 |
| 5,929,954 | * | 7/1999 | Omae et al. ......................... 349/66 |
| 6,025,894 | * | 2/2000 | Shirasaki et al. ..................... 349/69 |

FOREIGN PATENT DOCUMENTS 0802684   10/1997   (EP) .

OTHER PUBLICATIONS

Patent Abstracts of Japan, vol. 1997, No. 05, May 30, 1997 & JP 09 005766 A (Sharp Corp) Jan. 10, 1997.
Anonymous: "Privacy Screen for Mobile Computer", IBM Technical Disclosure Bulletin, vol. 39, No. 9, pp. 155–156, XP002128200.

* cited by examiner

*Primary Examiner*—James A. Dudek

(57) ABSTRACT

Variable viewing angle liquid crystal display screen systems are disclosed. They are useful, e.g. in automatic teller machines where, during parts of a transaction with a user, it is undesirable that information on screen can be read by others.

In accordance with the invention, interposed in a conventional display arrangement of reflector (2), backlight (1), diffuser (3), optional brightness enhancer (4, 5) and transmission type screen (6) are a collimator (10) and a variable diffuser (11). If the variable diffuser (11) is set to transparent, the light passing through the transmission type screen (6) is still collimated and accordingly the display on the screen is only effectively visible over a narrow viewing angle. If the diffuser (11) is set to diffuse the collimated light, then the display is visible over a very wide range of angles.

11 Claims, 3 Drawing Sheets

VISUAL DISPLAYS

BACKGROUND OF THE INVENTION

This invention relates to visual displays and, in particular, to displays enabling variation of the relationship between brightness and viewing angle.

It is well-known that in connection with any flat screen display, there is a relationship between the perceived brightness of the display and the viewing angle relative to the plane of the flat screen. This variation can be of value or a disadvantage, depending upon circumstances. Thus, in connection with a retro-reflective beaded cinema screen, the relatively narrow angle over which a satisfactorily bright image may be seen forces the design of narrower cinemas deeper from front to back, which may not always be the best use of space. On the other hand, in applications where the information to be displayed on screen may be needing to be kept secure, for example on the screen of a video display unit, it may be desirable to ensure that the image displayed on the screen can only be seen over a highly restricted range of viewing angles, usually only if the viewer's eyes are in a relatively narrow angled cone having its axis normal to the plane of the screen.

It is well-known to provide security screens for fitting over cathode ray tube displays. These consist of a screen incorporating some form of louvre, the components of the louvre running essentially in planes normal to the plane of the screen. The louvre may consist of a plurality of parallel planes in which case the restriction in viewing angle will apply, e.g. horizontally but not vertically or vice versa, or it may consist of a set of cells, e.g. formed by the notional intersection of two sets of orthogonal louvre panels, or, for example, the louvre may take the form of a honeycomb type construction.

In all such cases, the restriction on viewing angle imparted by the louvre type screen is permanent and invariable once the screen has been placed over the face of the display. While, in many cases, this may be entirely satisfactory, equally it is often not satisfactory at all.

In a screen display system is disclosed in which the range of viewing angles can be altered by the use of a screen which has an actuatable louvre. When unactuated, the screen is transparent and the display screen which it overlies can accordingly be viewed from a relatively wide range of viewing angles. If the actuatable louvre screen is actuated, on the other hand, planes within the screen running substantially perpendicular to the display screen are rendered opaque, and accordingly the display screen can only be viewed when those planes are substantially edge on to the observer. Thus, by simply actuating this type of louvre screen, the display viewing angle may be varied from wide to narrow and vice versa. Such a actuatable louvre screen is described in more detail in the above-noted application, and may be straightforwardly constructed using standard liquid crystal display technology.

One of the disadvantages of the system proposed in EP-A-0802684 is that the louvre screen must be placed over the display, which inevitably reduces the brightness of that display. This is naturally disadvantageous.

The problem underlying the invention is to produce a variable viewing angle display which does not suffer from the disadvantages of the prior suggestions.

SUMMARY OF THE INVENTION

We have now found that variable viewing angle displays may be constructed by interposing between a standard diffuse backlight illumination source and a transmission type liquid crystal display means for collimating the illumination from the backlight display to a greater or lesser extent.

Preferably, the means consist essentially of a collimator device adjacent a standard diffuse backlight unit and, between the collimator device and the transmission type liquid crystal display, a transparent/translucent member of controllable diffusivity. This last member should preferably be controllable between a state in which it is entirely transparent, i.e. allows the collimated light simply to pass through it without lateral dispersion or diffusion and one in which it is highly diffusive so that it acts to scatter and re-emit the collimated light, the re-emission occurring over a wide range of angles relative to the plane of the device itself.

The collimator device may be any convenient device which will act to channel the light from the diffuse backlight source so as to emerge effectively as a collimated beam. Preferred are thin films containing an internal louvre structure with the planes of the louvres being essentially perpendicular to the plane of the film. The louvre spacing is generally substantially less than the thickness of the film, preferably ten percent of the thickness of the film. The lower the percentage the greater the collimation, but the greater, usually, the expense of manufacturing the louvre film and/or the greater the transmission losses through the film.

It is often found useful to use a pair of adjacent louvre films, each with a relatively low ratio of louvre spacing to film thickness, for example from 1 to 4 to 1 to 7, since the combined louvre spacing to thickness ratio is then half that of either film but, more importantly, the tendency to form moiré patterns between the collimation device and the transmission type liquid crystal display is perceptibly reduced.

As noted above, between the transmission type liquid crystal display and the collimating device, there is a variable diffusibility device. Preferably, this takes the form of a so-called scattering cell which can be rendered optically transparent or optically scattering by the application of an appropriate electrical field to material, usually a liquid crystal material, comprised within the cell. Two known types of scattering cell may be used, viz. polymer dispersed liquid crystal cells or reverse mode polymer stabilized cholesteric texture cells. Both types are commercially available.

As will be apparent from consideration of the principle on which the present invention operates is that of varying the collimation/diffusion of the backlighting, the transmission type liquid crystal display may be selected from any such display, several varieties being already commercially available. Thus, the present invention may be used in combinations where the transmission type liquid crystal display overlying the backlighting unit, collimating unit and variable diffusing unit is, for example, one of the following types:

Super twisted nematic

Twisted nematic

In-plane switching

Ferro-electric liquid crystal

Passive matrix displays

Active matrix displays using a thin film transistor matrix or a metal insulator metal matrix The invention is of particular value in connection with display systems including transmission type display screens (usually LCD type screens) wherever security considerations are important. Thus, one particular area of application is in connection with displays used in automatic teller machines, i.e. fixed installations usually located in public places and having a screen display in a public place, the display giving information to a person who wishes to carry out some form of banking or other financial transaction, interacting with the machine via their observation of the display screen and, usually, an input device such as a touch screen, touch pad, keypad, keyboard or the like. In particular, the present invention provides automatic teller machines including variable viewing angle displays as set out above, wherein the viewing angle for the display is changed in accordance with the operating status of the automatic teller machine. By way of example, when no-one is attempting to transact any business with the machine, the viewing angle of the screen may be wide and the screen may carry, e.g. advertising information, animated cartoons to attract attention, or the like. However, when a transaction involving, e.g. a customer's balance is attempted, the balance may be displayed on the screen, but only after the display has been switched to narrow viewing angle mode, thus enabling only the user of the machine to see the balance displayed.

Other areas of application where it is desired for displays to operate in a relatively open mode at some stages, but a relatively secure mode in others, can be easily envisaged.

BRIEF DESCRIPTION OF THE DRAWINGS

The invention is illustrated by way of example with reference to the accompanying drawings in which.

DETAILED DESCRIPTION

Figure 1:
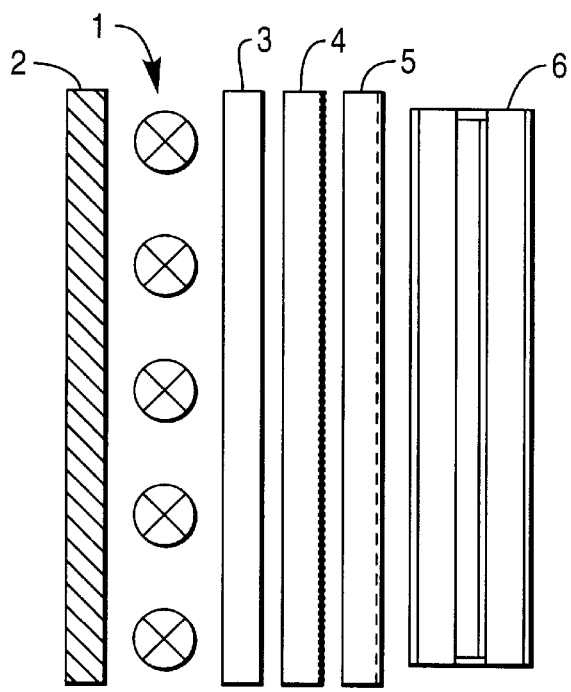
FIG. 1 is a diagrammatic illustration, not to scale, of a prior art backlight transmissive liquid crystal display device.

Referring first to the prior art system shown in FIG. 1, this shows a backlit transmissive liquid crystal display device. It is not to scale, but rather diagrammatic.

The transmissive LCD screen 6 is illuminated by a backlighting system consisting of a bank of fluorescent lamps 1 backed by a mirror 2. The fluorescent lamps may be a single lamp or a serpentine fluorescent tube. Between the LCD screen 6 and the lamp(s) 1 are a diffuser 3 and two brightness enhancement films 4, 5 of known type. The screen may be viewed from a wide range of angles, although it is brightest when viewed normal to the screen.

Figure 2:
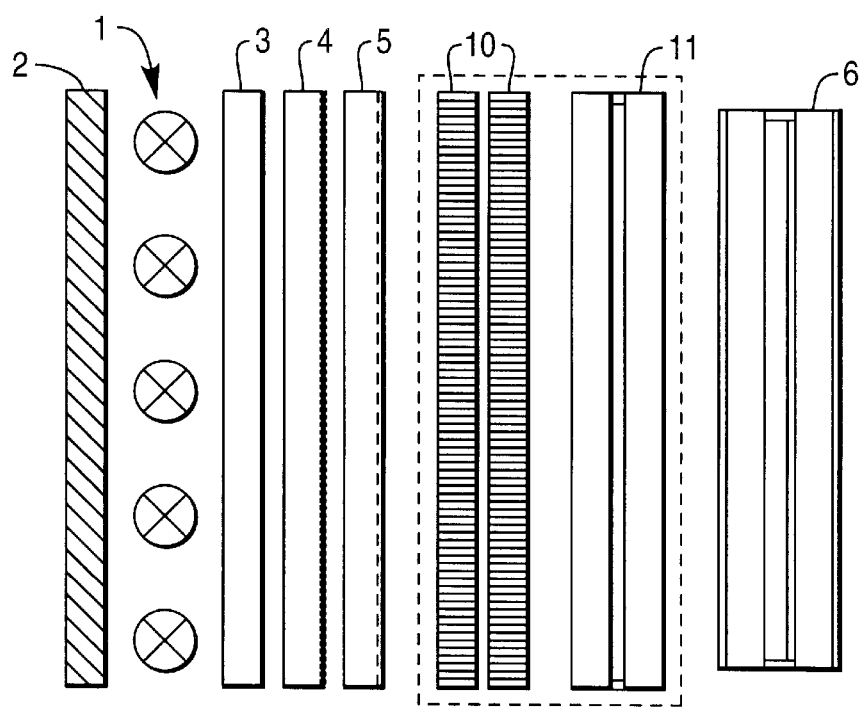
FIG. 2 is a similar view to FIG. 1, but of a display device in accordance with the present invention.

FIG. 2, in which the same reference numbers have been retained for the known parts, shows a system in accordance with the invention. Between the brightness enhancement film 5 and the LCD screen 6 are located a collimating unit 10 and a variable diffusiveness cell 11. The cell 11 can be switched between a transparent and a scattering state by applying an electrical field thereto. It may be a polymer dispersed liquid crystal cell or a reverse mode polymer stabilized collisteric texture cell. Both of these are known.

The collimating unit 10 consists of two louvre films through which light passes in essentially straight lines only. The greater the ratio of the combined depth of the films to the louvre spacing, the greater the degree of collimation and accordingly the narrower the beam of light which essentially then passes (when the variable diffusiveness cell 11 is purely transparent) through the cell 11 and then display screen 6. Although display screen 6 is itself slightly diffusive, it is only slightly so and this means that the display in screen 6 can then only be seen when viewed head on or over a narrow range of angles.

Figure 3:
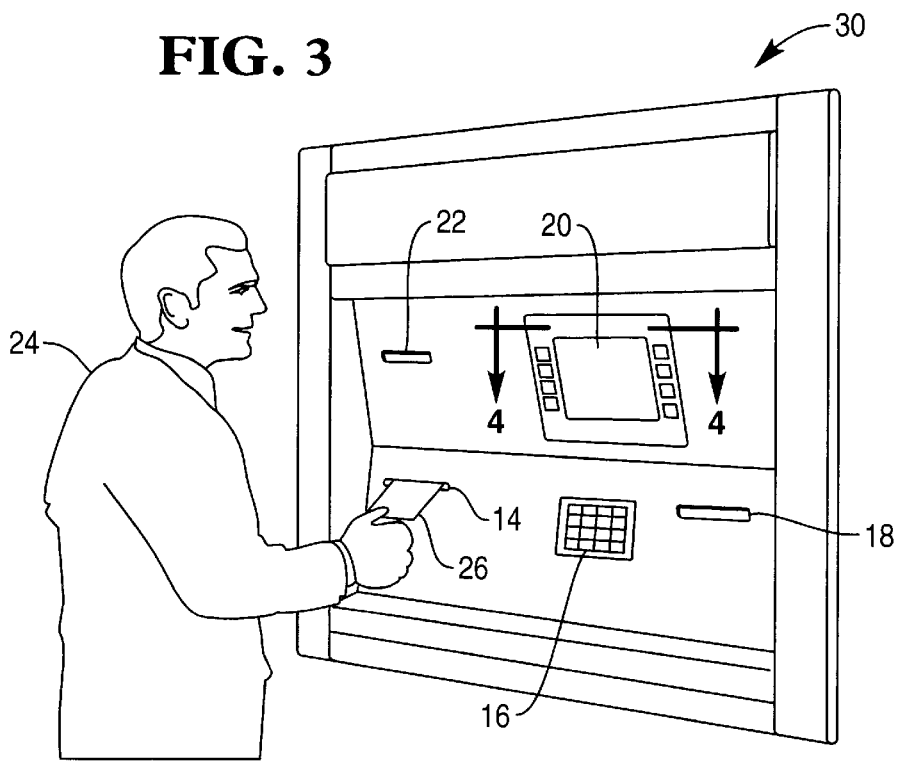
FIG. 3 is a perspective view of an automatic teller machine (ATM) and user.

Such screens are particularly useful in automatic teller machines. FIG. 3 shows in perspective view an illustration of a man 24 standing in front of an automated teller machine 30 which has in standard fashion an insertion slot 14 for the man 24 to insert his ATM card 26. Interaction with the automated teller machine takes place then via a keypad 16, into which, for example, a personal identification number may be punched by the user. There may be additional actuation buttons located to either side of the screen 20 which the user 24 views during the transaction, or screen 20 may be provided with, e.g. an overlaying touch screen which can likewise be used for putting data correlated to the screen display.

Once the transaction has been concluded, the ATM may, for example, dispense cash through a slot 18 or printed data such as a transaction slip, statement of balance or the like through a slot 22.

Figure 4:
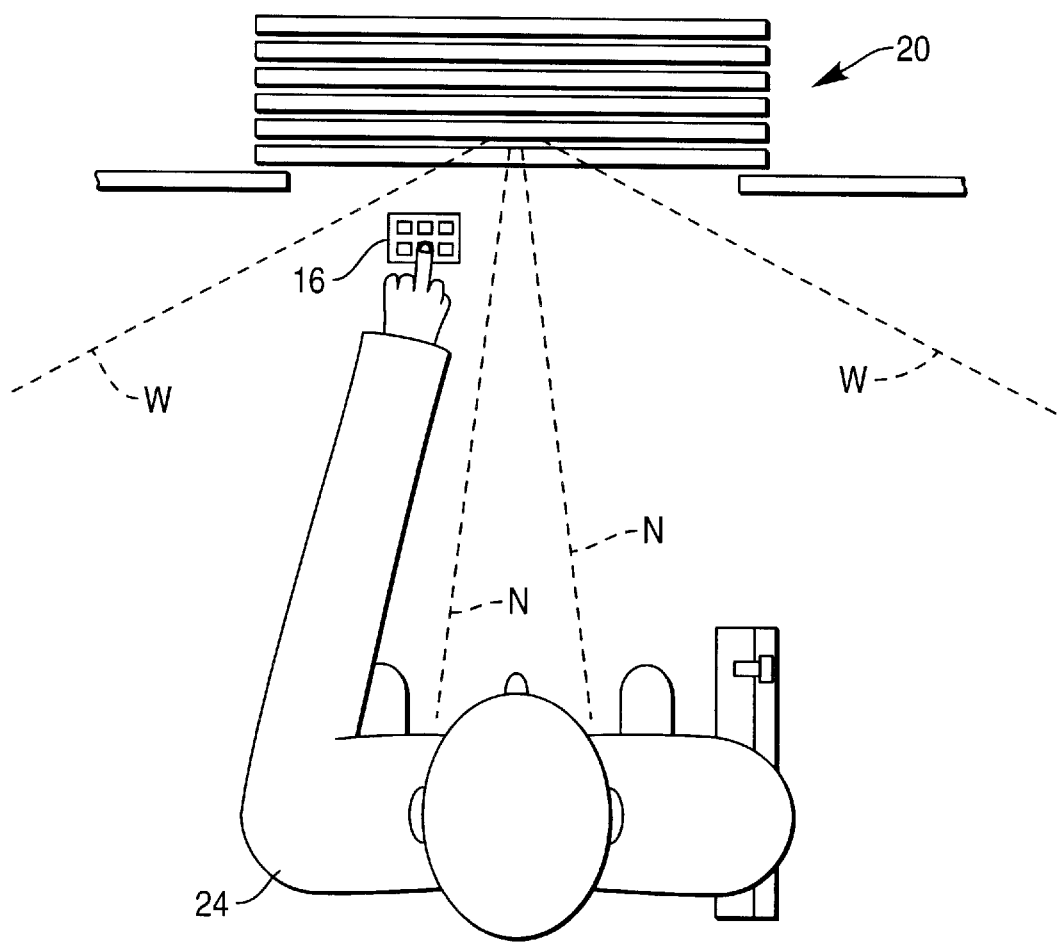
FIG. 4 is a part section through the screen of the ATM.

If the ATM is fitted with a display system in accordance with the invention, then the angle over which the display may be satisfactorily viewed may be varied. This is easiest seen by looking at FIG. 4 which is a diagrammatic vertical view of man 24 standing in front of the display 20.

When he first does so, the display is visible over a wide range of angles, for example effectively between the dashed lines W. However, once he starts actuating the ATM, e.g. by inserting his card into card reader 14, the display may be controlled such that it is visible only over a narrow range of angles between the lines N identified on FIG. 4.

Figure 5:
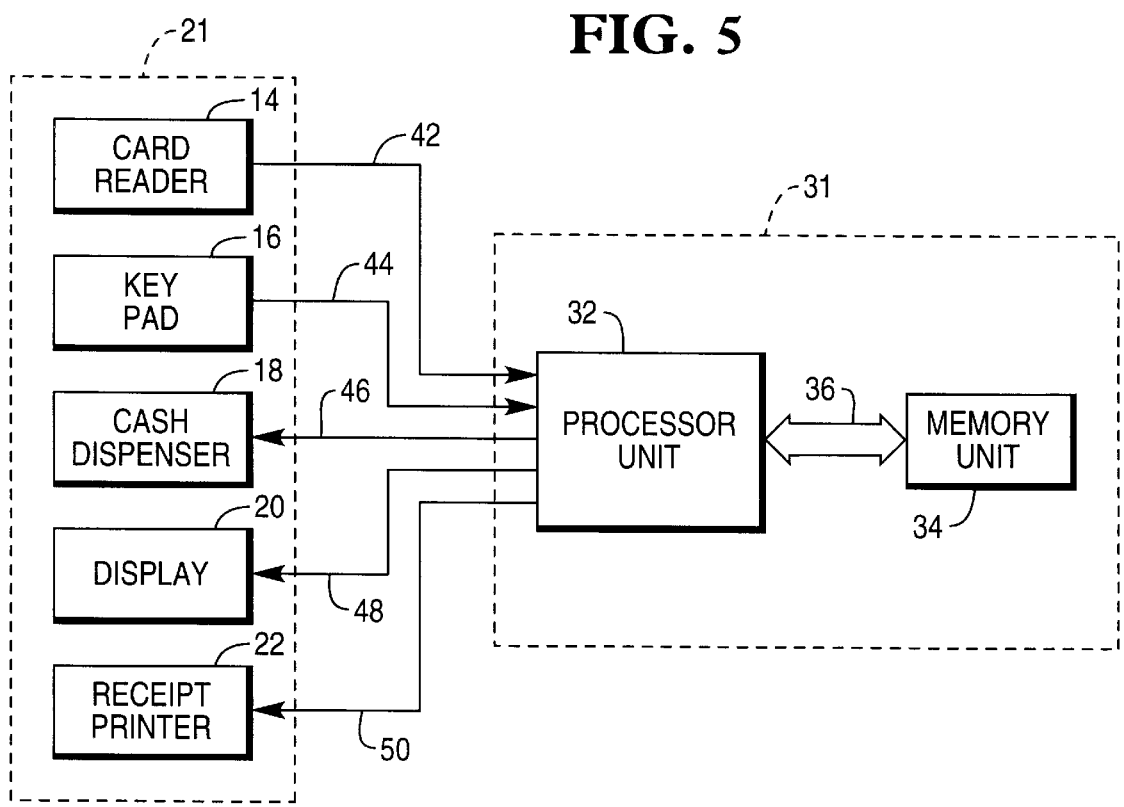
FIG. 5 is a block diagram of the functional electronics of the ATM.

This control is effected by the electronics internally of the ATM which are diagrammatically shown in FIG. 5. Referring to this FIG., it can be seen that the ATM consists basically of a front panel with associated units 21 connected to a controller unit 31 located within the machine. Front panel 21, as indicated above, includes a card reader 14, keypad 16, cash dispenser with slot 18, display 20 and a printer, e.g. for receipts, 22. These are connected to a processor unit 32 in controller unit 31 which may communicate as necessary via a bus 36 with a memory unit 34.

Signals from the card reader and keypad are fed via leads 42 and 44 into the processor unit 32 and leads 46, 48 and 50 enable the processor unit 32 to control cash dispenser 18, display 20 and receipt printer 22. Although all of these leads 42 to 50 are shown as single lines on FIG. 5, they may, of course, be multiple conductor cables or other means down which relevant signals may be sent.

In accordance with the invention, the processor unit is programmed to switch the display from wide angle viewing mode when no transactions are being operated to narrow angle viewing mode during a transaction.

What is claimed is:

1. A variable viewing angle display system comprising:
   a diffuse backlight illumination source;
   an overlying transmission type liquid crystal display; and
   means for collimating illumination from the backlight source to a greater or lesser extent.

2. A system according to claim 1, wherein the collimating means includes a collimator device adjacent the diffuse backlight illumination source, and a transparent/translucent member of controllable diffusivity between the collimator device and the transmission type liquid crystal display.

3. A system according to claim 2, wherein the controllable diffusivity member is controllable between a state in which it is entirely transparent and allows light to pass through it without lateral dispersion or diffusion and a state in which it is highly diffusive.

4. A system according to claim 3, wherein the controllable diffusivity member includes a scattering cell which can be rendered optically transparent or optically scattering by the application of an appropriate electrical field to liquid crystal material within the cell.

5. A system according to claim 4, wherein the scattering cell comprises a polymer dispersed liquid crystal cell.

6. A system according to claim 4, wherein the scattering cell comprises a reverse mode polymer stabilized cholesteric texture.

7. A system according to claim 1, wherein the collimating means includes a thin film having an internal louvre structure with the planes of the louvres being substantially perpendicular to the plane of the film.

8. A system according to claim 7, wherein the collimating means includes a pair of adjacent louvre films, each with a relatively low ratio of louvre spacing to film thickness.

9. A system according to claims 1, wherein the transmission type liquid crystal display includes a twisted nematic or super-twisted nematic.

10. An automatic teller machine (ATM) comprising:
a display screen having a variable viewing angle;
a diffuse backlight illumination source;
an overlying transmission type liquid crystal display; and
means for collimating illumination from the backlight source to a greater or lesser extent.

11. An automatic teller machine according to claim 9, further comprising means for controlling the variable viewing angle based upon operating status of the ATM.

* * * * *